(12) United States Patent
Walton (10) Patent No.: US 12,551,234 B2
(45) Date of Patent: *Feb. 17, 2026

(54) SYSTEMS AND METHOD FOR SINGLE-OPERATOR NEURAXIAL MEDICAL DEVICE PROCEDURES USING REAL-TIME ULTRASOUND GUIDANCE

(71) Applicant: Zachary Walton, Farmington, CT (US)

(72) Inventor: Zachary Walton, Farmington, CT (US)

(*) Notice: Subject to any disclaimer, the term of this patent is extended or adjusted under 35 U.S.C. 154(b) by 425 days.

This patent is subject to a terminal disclaimer.

(21) Appl. No.: 17/878,842

(22) Filed: Aug. 1, 2022

(65) Prior Publication Data

US 2023/0034655 A1 Feb. 2, 2023

Related U.S. Application Data

(60) Provisional application No. 63/227,391, filed on Jul. 30, 2021.

(51) Int. Cl.
  *A61B 17/34* (2006.01)
  *A61B 8/08* (2006.01)
  *A61B 90/00* (2016.01)

(52) U.S. Cl.
  CPC ........ *A61B 17/3403* (2013.01); *A61B 8/0841* (2013.01); *A61B 2017/3413* (2013.01); *A61B 2090/378* (2016.02)

(58) Field of Classification Search
  CPC ....... A61B 8/0841; A61B 8/461; A61B 8/463; A61B 8/465; A61B 8/466; A61B 8/483; A61B 8/54; A61B 8/4209; A61B 8/468; A61B 8/469; A61B 8/0875; A61B 17/3403; A61B 2017/3413; A61B 2017/3405; A61B 2017/3411
  See application file for complete search history.

(56) References Cited

U.S. PATENT DOCUMENTS

| | | | |
|---|---|---|---|
| 5,758,650 A | 6/1998 | Miller et al. | |
| 6,616,610 B2 | 9/2003 | Steininger et al. | |
| 7,588,541 B2 | 9/2009 | Floyd et al. | |
| 8,556,815 B2 | 10/2013 | Pelissier et al. | |
| 9,649,161 B2 | 5/2017 | Lee | |
| 9,687,209 B2 | 6/2017 | Lee | |
| 9,724,070 B2* | 8/2017 | Boezaart | A61B 8/4209 |
| 10,485,513 B2 | 11/2019 | O'Connor et al. | |
| 2011/0301451 A1* | 12/2011 | Rohling | A61B 8/4477 |
| | | | 600/443 |

(Continued)

FOREIGN PATENT DOCUMENTS

WO 2019136412 A1 7/2019

OTHER PUBLICATIONS

Yoo S, Kim Y, Park SK, Ji SH, Kim JT. Ultrasonography for lumbar neuraxial block. Anesth Pain Med (Seoul). Oct. 30, 2020; 15(4):397-408. doi: 10.17085/apm.20065. PMID: 33329842; PMCID: PMC7724125. (Year: 2020).*

(Continued)

*Primary Examiner* — Michael J Carey
*Assistant Examiner* — Zainab Mohammed Aldarraji
(74) *Attorney, Agent, or Firm* — Bedingfield Law, LLC (57) ABSTRACT

Aspects of the present disclosure describe medical device placement, including devices, systems and methods for placing catheters, such as epidural catheters, or other medical devices, such as needles, using a guide on a sterile ultrasound sheath.

26 Claims, 5 Drawing Sheets

(56) References Cited

U.S. PATENT DOCUMENTS

| | | | |
|---|---|---|---|
| 2012/0289820 A1* | 11/2012 | Rohling | A61B 8/0841 |
| | | | 600/424 |
| 2013/0197355 A1 | 8/2013 | Lee et al. | |
| 2016/0022308 A1* | 1/2016 | Rohling | A61M 5/46 |
| | | | 604/117 |
| 2016/0317118 A1 | 11/2016 | Parthasarathy et al. | |
| 2016/0374644 A1 | 12/2016 | Mauldin, Jr. et al. | |
| 2018/0263597 A1* | 9/2018 | Tchang | A61B 90/50 |
| 2019/0125470 A1* | 5/2019 | Moskowitz | A61B 17/3403 |
| 2019/0209119 A1 | 7/2019 | Mauldin, Jr. et al. | |
| 2019/0209130 A1 | 7/2019 | Lieblich et al. | |
| 2019/0282262 A1* | 9/2019 | Bouazza-Marouf | |
| | | | A61B 17/3403 |
| 2021/0045715 A1* | 2/2021 | Mauldin | G16H 50/20 |
| 2024/0058033 A1 | 2/2024 | Walton | |

OTHER PUBLICATIONS

Conroy et al., "Real-Time Ultrasound-Guided Spinal Anaesthesia: A Prospective Observational Study of a New Approach", Hindawi Publishing Corporation, Anesthesiology Research and Practice, vol. 2013, Article ID 525818, 2012, 7 Pages.

Karmakar et al., "Real-Time Ultrasound-Guided Paramedian Epidural Access: Evaluation of a Novel In-Plane Technique", British Journal of Anaesthesia, 102 (6), 2009, pp. 845-854.

Pesteie, "Machine Learning in Ultrasound-Guided Spinal Anesthesia", The University of British Columbia, Sep. 2019, 155 Pages.

\* cited by examiner

SYSTEMS AND METHOD FOR SINGLE-OPERATOR NEURAXIAL MEDICAL DEVICE PROCEDURES USING REAL-TIME ULTRASOUND GUIDANCE

CROSS-REFERENCE TO RELATED APPLICATIONS

This application claims the benefit of U.S. Provisional Application Ser. No. 63/227,391, filed Jul. 30, 2021, the disclosure of which is incorporated herein by reference in its entirety.

FIELD

The present technology is generally related to medical device placement, for example catheters, needles, etc., using a single-operator neuraxial medical device with real-time ultrasound guidance.

BACKGROUND

Neuraxial procedures (e.g., epidurals, spinals, paravertebrals, erector spinae plane blocks) are an important part of medicine. Adoption of ultrasound guidance for these procedures has been slow because of the relative difficulty of this anatomy compared to other parts of the body. In particular, when using ultrasound for real-time guidance in a neuraxial procedure, the needle and the ultrasound beam are typically nearly collinear, which makes visualizing the needle difficult. Furthermore, the procedure often requires two hands on the needle, which means a second operator may be required to hold the ultrasound probe. For these reasons, the majority of neuraxial procedures are performed without ultrasound guidance; and the operator relies on his or her knowledge of anatomy to guide the needle. The target for these procedures is typically one or two millimeters in spatial extent. When patients are obese, the target may be 8 cm or more below the surface of the skin. Achieving the desired accuracy without real-time guidance in these circumstances is difficult even for skilled practitioners.

Figure 1:
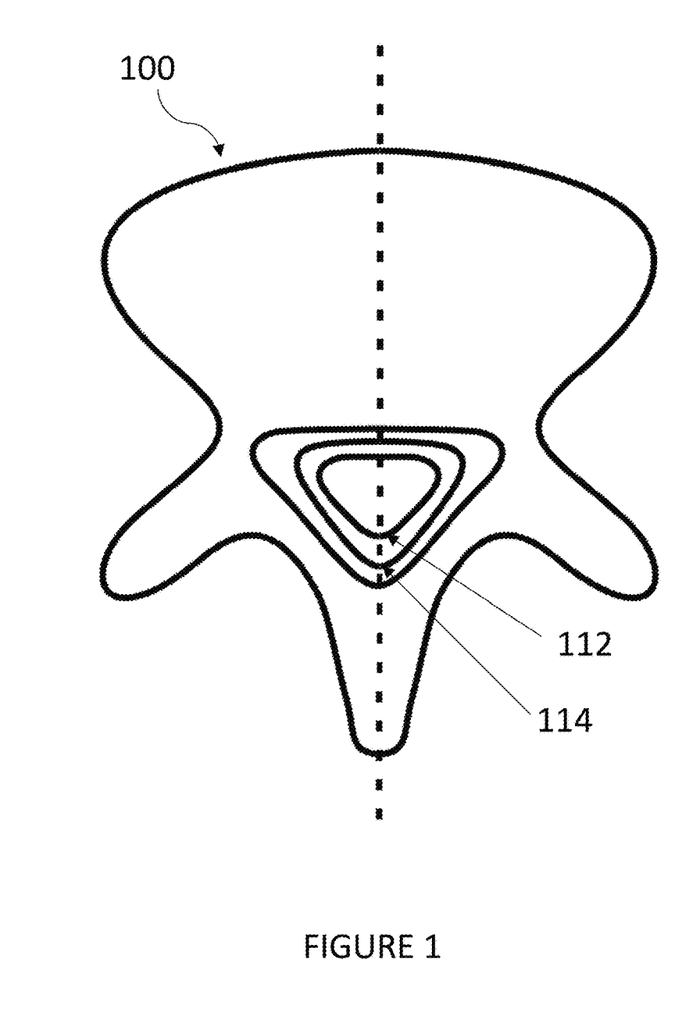
FIG. 1 is an exemplary front elevation view of needle trajectory approaches showing the axial cross-section of the lumbar spine showing the target for spinals and epidurals (the intersection of the posterior dura and the patient midline)

For epidurals and spinals, the goal is to advance a needle into the epidural space and the spinal space, respectively, which are shown generally at 100 in FIG. 1. The needle trajectory for both procedures is chosen so that the needle is directed to the midline of the posterior dura (112 in FIG. 1). For epidurals, the needle is advanced through the ligamentum flavum (114 in FIG. 1) but stopped prior to puncturing the dura (this is the epidural space). For spinals, the needle is advanced through the dura (112 in FIG. 1) in order to deposit medication in the cerebrospinal fluid (or withdraw cerebrospinal fluid for diagnostic purposes). In each case, the goal is to be as close to the midline as possible when the needle reaches the destination, since the incidence of complications and failed procedures increases as the needle moves laterally.

Figure 2:
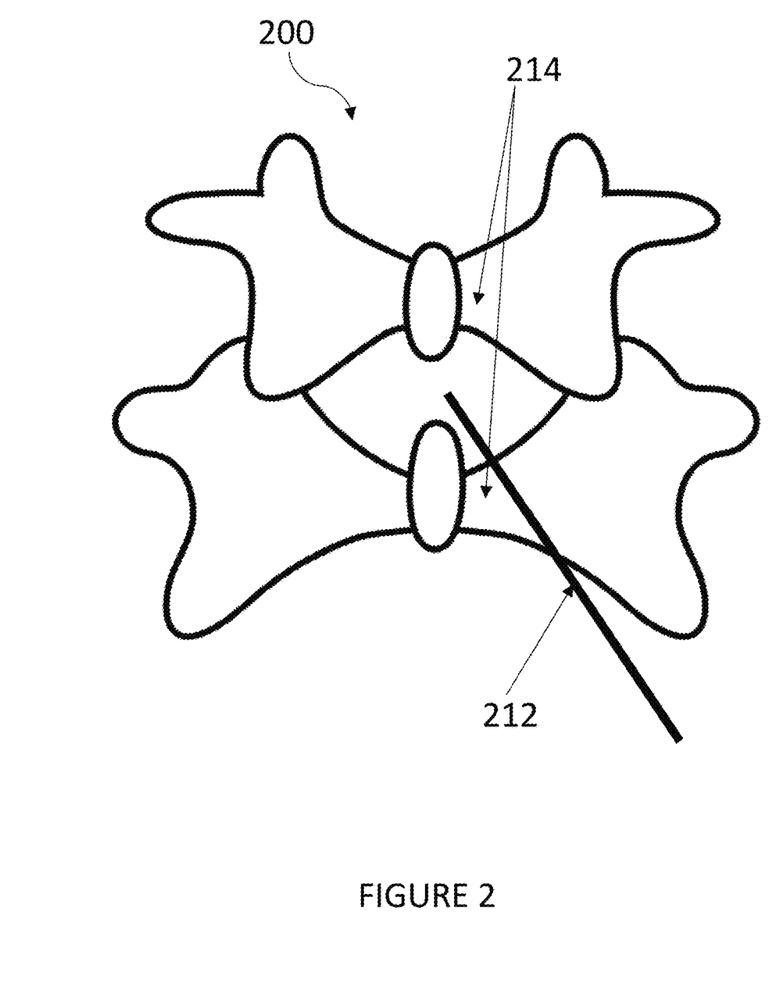
FIG. 2 is an exemplary front elevation view of a needle trajectory approach for the posterior spine showing the space between lamina that the needle traverses in the paramedian approach.

In addition to directing the needle to the midline of the posterior dura, one must avoid the bony obstacles presented by the spine. FIG. 1 is an axial view of the spine which shows the obstruction by the spinous process along the posterior midline. FIG. 2 is a posterior view of the spine which shows the obstruction by the lamina (214 in FIG. 2).

The present disclosure recognizes that the failure rate for these and other procedures results from inaccuracies due to established procedures for placement and recognizes that there is a need in the art for improvements in ease, reliability, and repeatability of medical device placement, for epidural catheters or for other medical devices. This disclosure introduces a method for using ultrasound for real-time guidance of medical device placement for neuraxial procedures and overcomes the above-described and other challenges and problems in the art.

SUMMARY

The techniques of this disclosure generally relate to medical device placement, including devices, systems and methods for placing catheters, such as epidural catheters, or other medical devices, such as needles, using a guide on a rigid, sterile ultrasound sheath. Exemplary embodiments describe a single-operator medical device and single-operator neuraxial procedures with real-time ultrasound guidance.

In one exemplary aspect, a device is provided that facilitates single-operator neuraxial procedures with real-time ultrasound guidance. The exemplary device allows the operator to place the needle with (e.g.) millimeter precision with one needle pass and complete the procedure without assistance. The device includes a sterile, single-use assembly (e.g., of plastic components, though other materials are contemplated) with several moving parts. With regard to use of plastic components, this may provide an inexpensive, disposable device that still facilitates precision placement.

In further exemplary embodiments, a system includes a plurality of devices produced/provided (e.g., in a kit or individually) in different versions, one for each of the commonly used commercial ultrasound probes and/or in different sizes or with different contouring for different patient categories. In further exemplary embodiments, software add-ons are provided for existing commercial ultrasound devices that further enhance the performance of the device.

In further exemplary embodiments, the device is configured to avoid the bony obstacles presented by the spine by implementing the paramedian approach (depicted in FIG. 2), in which the needle (212 in FIG. 2) enters the skin at a point, e.g., approximately 2 cm lateral to the midline and is directed medial and cephalad to pass through the window between adjacent lamina). The paramedian approach is implemented because the window through the bony obstructions is typically larger in this approach as compared to the midline approach.

In exemplary embodiments, the device includes an outer frame, which sits flat against the patient's back and is held in place thereon (e.g., via adhesive pads at the perimeter of the frame). In further exemplary aspects, an inner frame rides along the outer frame parallel to the x-axis, with motion controlled via a first rotatable member, (e.g., an "x knob"). A further inner frame rides along the inner frame parallel to the y-axis, with motion controlled via a second rotatable member (e.g., a "y knob").

In further exemplary embodiments, the innermost frame (e.g., the frame that moves parallel to the y-axis) has a cutout (e.g., a circular cutout) in which rests a rigid probe sheath configured to hold an ultrasound probe. The probe sheath includes one or more integral needle guides. In further exemplary aspects, the probe sheath is configured to rotate around the z-axis so that the probe can be changed from an axial view to a parasagittal oblique view.

In further exemplary embodiments, the sheath is configured such that the ultrasound beam is deflected at a predetermined angle (e.g., at 15 degrees in the cephalad direction when the probe is in the axial position, though other angles between 0 and 30 degrees are also contemplated in exemplary embodiments), with the angle chosen to represent a typical angle that the channel between spinous processes makes with the skin surface.

In further exemplary embodiments, the sheath includes three needle guides, each angled back to the ultrasound beam such that the needle trajectories intersect the beam at different depths, e.g., at 4 centimeters (cm), 5 cm and 6 cm (configured for a population of patients whose dura is in the range of, e.g., 3.5 and 6.5 cm below the skin. Other possibilities include e.g., 7 cm, 8 cm and 9 cm, e.g., for a device version configured for larger patients. An exemplary third device configuration includes needle guides for 10 cm, 11 cm and 12 cm. An exemplary fourth device configuration includes needle guides for 13 cm, 14 cm, and 15 cm for even larger patients (e.g., with device selection based upon patient height and weight to estimate the depth of the target in order to select an appropriate device version or component). As we have noted, different device versions may be configured/provided as a kit or individually (and indeed as whole assembled device versions, or with coupled device component versions, e.g., with a focus on the ultrasound probe sheath and integrated needle guides. In such exemplary embodiments, the sheaths or the medical device may further be identified according to angle or by a category of patient dependent upon the one or more patient parameters affecting the provided angle for the medical device guide.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The techniques of this disclosure generally relate to medical device placement, including devices, systems and methods for placing catheters, such as epidural catheters, or other medical devices, such as needles, using a guide on a sterile ultrasound sheath. Exemplary embodiments describe a single-operator medical device and single-operator neuraxial procedures with real-time ultrasound guidance.

In one exemplary aspect, a device is provided that facilitates single-operator neuraxial procedures with real-time ultrasound guidance. The exemplary device allows the operator to place the needle with (e.g.) millimeter precision with one needle pass and complete the procedure without assistance. The device includes a sterile, single-use assembly (e.g., of plastic components, though other materials are contemplated) with several moving parts. With regard to use of plastic components, this may provide an inexpensive, disposable device that still facilitates precision placement.

In further exemplary embodiments, a system includes a plurality of devices produced/provided (e.g., in a kit or individually) in different versions, one for each of the commonly used commercial ultrasound probes and/or in different sizes or with different contouring for different patient categories. In further exemplary embodiments, software add-ons are provided for existing commercial ultrasound devices that further enhance the performance of the device.

In further exemplary embodiments, with further reference to FIG. 2, the device is configured to avoid the bony obstacles presented by the spine by implementing the paramedian approach, in which the needle 212, enters the skin at a point, e.g., approximately 2 cm lateral to the midline and is directed medial and cephalad to pass through the window between adjacent lamina 214.

FIGS. 3A-3D illustrate an exemplary device, shown generally at 300, including an outer frame 312, which has a patient facing surface (shown generally at 314) that sits flat against a patient's back (not shown, though portions of a patient's spinal anatomy are generally shown at 316) and is held in place thereon (e.g., via adhesive pads 318 at the perimeter, shown generally at 320, of the frame 312). We note that such placement is merely exemplary, and that other portions interior of the perimeter may have adhesive or other patent securing aspects.

In further exemplary aspects, a first inner frame 322 rides along the outer frame 312 parallel to the x-axis, shown in exemplary orientation, along with the y-axis generally at 324, with motion controlled via a first rotatable member 326, e.g., an "x knob." A second, further inner frame 328 rides along the first inner frame 322 parallel to the y-axis, with motion controlled via a second rotatable member 330 (e.g., a "y knob"). It should be noted that the described nested frames and/or rotatable translation members are merely exemplary, and that alternate embodiments that facilitate translational movement in an x-y plane, inclusive of clips, slides, one or more floating frames or members movable in one or plural directions, etc., are also contemplated herein.

In further exemplary aspects, the translational member (e.g., knobs, 326, 330) also include lock out features, preventing rotation while not engaged by a user. For example, in FIG. 3A, these are represented by push buttons 327 and 331, which must be pressed in order to enable translation of the device component(s) holding the sheath (with release of the push buttons locking further translation). While push buttons are described herein, other mechanisms for preventing translation without operator contact for the translational member(s) are also contemplated herein.

Figure 3A:
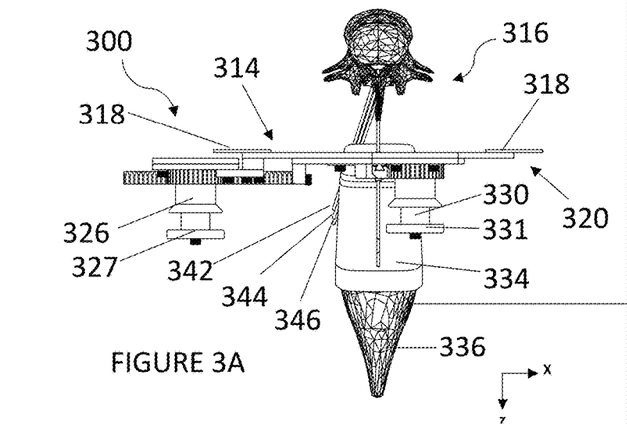
FIG. 3A is a top elevation view of an exemplary medical device in the axial position in accordance with embodiments of the present disclosure.
Figure 3B:
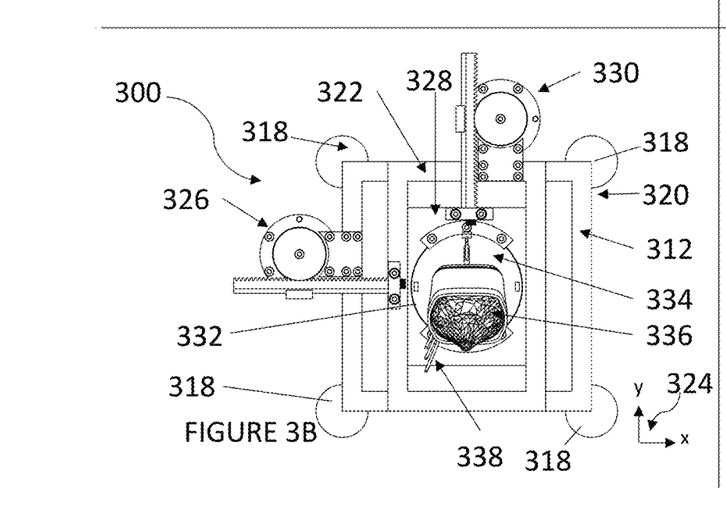
FIG. 3B is a front elevation view of the exemplary medical device of FIG. 3A.
Figure 3C:
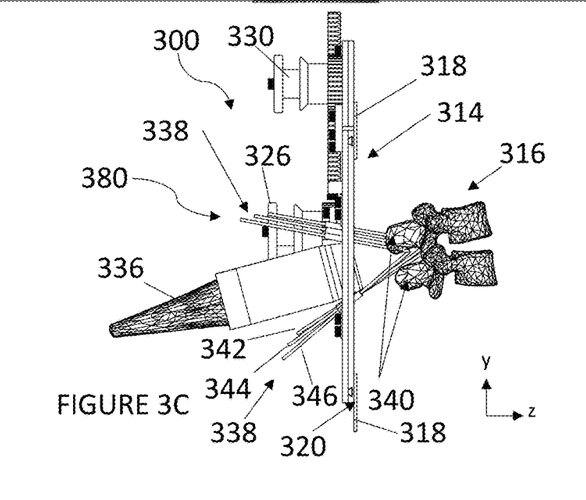
FIG. 3C is a side elevation view of the exemplary medical device of FIG. 3A.
Figure 4A:
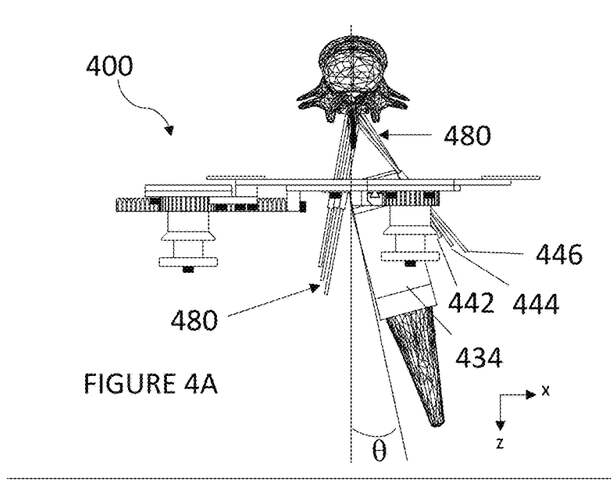
FIG. 4A is a top elevation view of an exemplary medical device in the parasagittal oblique position in accordance with embodiments of the present disclosure.

In further exemplary embodiments, the second, innermost frame 328 (e.g., the frame which moves parallel to the y-axis) has a cutout 332 (e.g., a circular cutout) in which rests a probe sheath (shown at 334) configured to hold an ultrasound probe 336. The probe sheath includes at least one integral needle guide, shown generally at 338. In further exemplary aspects, the probe sheath is configured to rotate around the z-axis so that the probe can be changed from an axial view to a parasagittal oblique view (note that FIG. 3C shows needle guides (in this case 3 needle guides) 338 in alternate positions according to such rotation). FIG. 4A, which will be further described below, also shows the needle guides in such alternate positions due to the prescribed rotation of the ultrasound probe sheath.

In exemplary embodiments, such rotation may be by free rotation, or may be by controlled rotation along a prescribed path, e.g., via a friction release member around that path and/or a lockout member or other mechanism configured to lock or otherwise fix the rotatable portion into position at those prescribed positions for the desired medical procedure. We note FIGS. 4A-4D, which further illustrate exemplary details of a device as in FIGS. 3A-3D but now with the probe-sheath component having been rotated into the sagittal oblique orientation, shown generally at 400, and in particular FIG. 4B, showing in exemplary embodiments a fixing member such as latch 412 configured to allow the above indicated (or other) positions to be arrested or locked in place (e.g., the fixing member being complementary magnets or other mechanisms to at least partially arrest the probe-sheath in a desired position).

Figure 5:
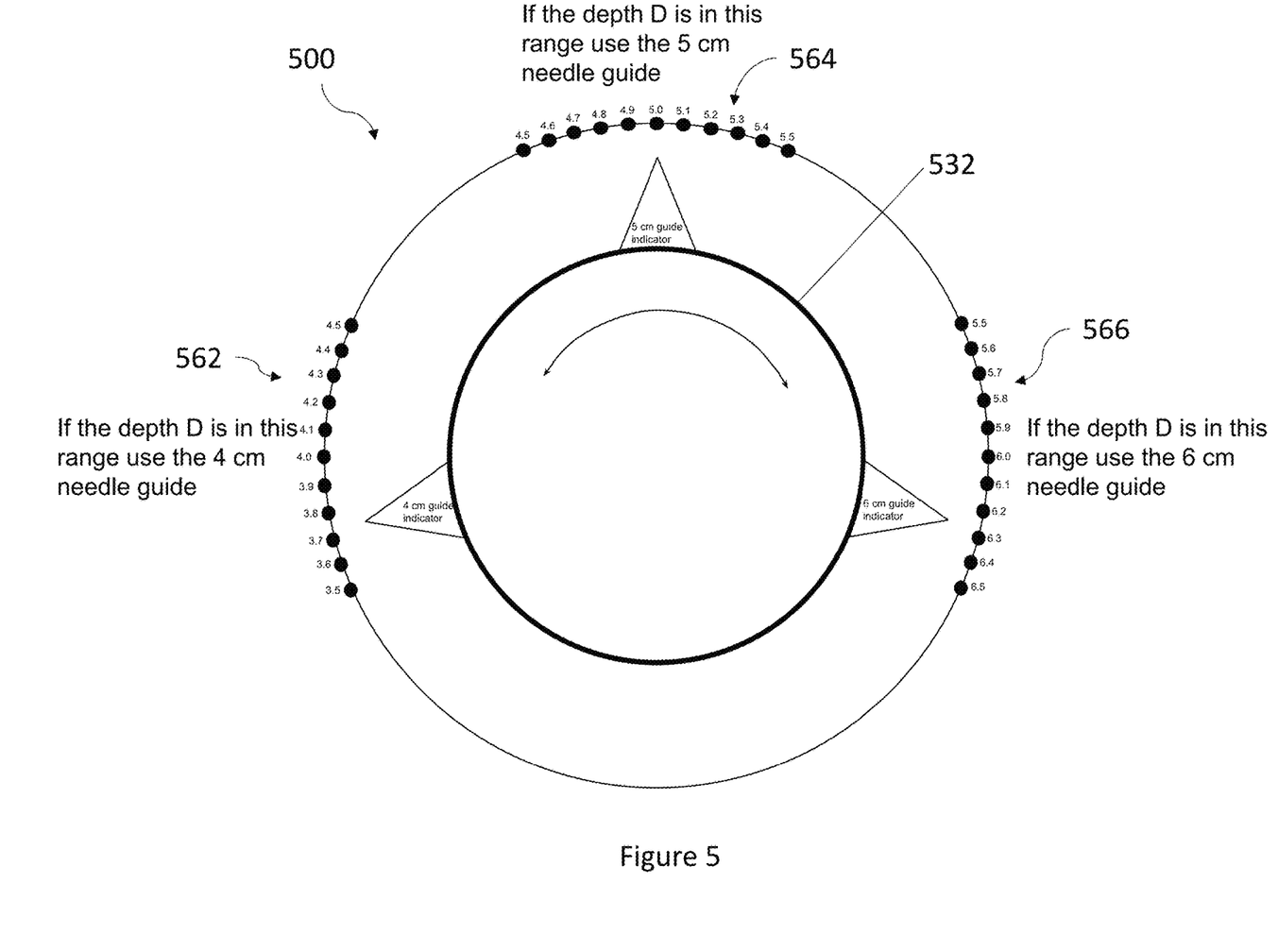
FIG. 5 is a schematic of an exemplary x-translation knob with markings for operator determined depth of the target D.

Additionally, with further reference to FIG. 5, the adjustment of the x knob may be guided by device markings, shown generally at 500 around the circumference of the x knob, shown as 532 in FIG. 5. FIG. 5 shows a schematic of an exemplary x knob with markings for operator determined depth of the target D while the probe is in the axial configuration. Once the probe is rotated to the parasagittal oblique position, the value D (the small numbers along the outer circle) is used as a guide as to which needle guide to use, and how to adjust the x knob so that the desired needle guide is aligned with the target. In exemplary aspects, the operator finds the appropriate location along perimeter markings corresponding to the measured value of D. This location guides the operator in deciding which of the three needle guides to use and how to turn the x knob For example, if the operator measures the depth of the target D to be 4.2 cm, when it is time to adjust the x knob, the operator would look to the markings on the x knob at 562 to find the value 4.2. This would indicate that the operator should use the 4 cm needle guide and turn the x knob such that the indicator nearest the 4.2 cm mark points to the 4.2 cm mark. For these exemplary markings, the exemplary stepwise markings allow for adjustment to positions (each of which may be fixed) in tenth increments between 3.5 and 4.5. At 564, for a 5 cm needle guide indication, markings are generally shown at 564, showing exemplary tenth adjustments between 4.5 and 5.5 cm. At 566, for a 6 cm needle guide indication, markings are generally shown at 564, showing exemplary tenth adjustments between 6.5 and 7.5 cm. The present disclosure also contemplates other markers, color indicators, etc., configured to easily and effectively permit a medical professional (e.g., an anesthesiologist) to dial in the correct position during a single-operator procedure as are provided by exemplary embodiments disclosed herein.

In further exemplary embodiments, the sheath (probe sheath) 334, shown as 434 in FIGS. 4A-4D, is configured such that the ultrasound beam is deflected at a predetermined angle θ (e.g., at 15 degrees in the cephalad direction when the probe is in the axial position, though other angles between 0 and 30 degrees are also contemplated in exemplary embodiments), with the angle chosen to represent a typical angle that the channel between spinous processes (340 in FIG. 3C) makes with the skin surface. In exemplary embodiments, when the probe is held at this angle, in the axial position, the ultrasound beam has an optimal chance of imaging the ligamentum flavum and posterior dura (as shown in the alternate positions illustrated by FIG. 3C).

In further exemplary embodiments and with reference to FIGS. 3A-3C and FIGS. 4A-4C, the sheath 334, 434 includes three needle guides 342, 344, and 346 and 442, 444 and 446, each angled back to the ultrasound beam such that the needle trajectories intersect the beam at different depths, e.g., at 4 centimeters (cm), 5 cm and 6 cm (configured for a population of patients whose dura is between e.g., 3.5 and 6.5 cm below the skin. Other possibilities include e.g., 7 cm, 8 cm and 9 cm, e.g., for a device version configured for larger patients. An exemplary third device configuration includes needle guides for 10 cm, 11 cm and 12 cm. An exemplary fourth device configuration includes needle guides for 13 cm, 14 cm, and 15 cm for even larger patients (e.g., with device selection based upon patient height and weight to estimate the depth of the target in order to select an appropriate device version or component). As we have noted, different device versions may be configured/provided as a kit or individually (and indeed as whole assembled device versions, or with coupled device component versions, e.g., with a focus on the ultrasound probe sheath and integrated needle guides. In such exemplary embodiments, the sheaths or the medical device may further be identified according to angle or by a category of patient dependent upon the one or more patient parameters affecting the provided angle for the medical device guide.

The exemplary needle guide(s) may be angled, e.g., between 0 and 30 degrees, with angulation chosen to give the best result for the chosen medical procedure. For example, one or more needle guides provided at a 15-degree angle toward the cephalad direction when the probe is in the parasagittal oblique view, as in FIG. 4C, position 450 provides an exemplary clear path between the lamina (see 452 in FIGS. 4C and 4D), which have natural angulation relative to a patient's back. We also refer to underlying U.S. Provisional Patent Application No. 63/227,391, filed Jul. 30, 2021, which describes various angles and ranges of angles (e.g., 5-25 degrees, 10-20 degrees, etc.) for needle guide(s), medical device contouring, various procedures and approaches for medical device placement and various related devices for such procedures, plural ultrasound images or axes, artificial intelligence for medical device placement, exemplary disposable ultrasound shells or sheath aspects, further camera assistance for depth placement, use of markers or other components, virtual needles, needle visualization, sterile packaging and kit options, hand-held device configurations and options, etc., the contents of which are all incorporated by reference herein with regard to the embodiments disclosed herein and otherwise.

Various exemplary procedures will also be described below relating to the above-described exemplary medical device(s):

Placing a Lumbar Epidural Catheter

Figure 6:
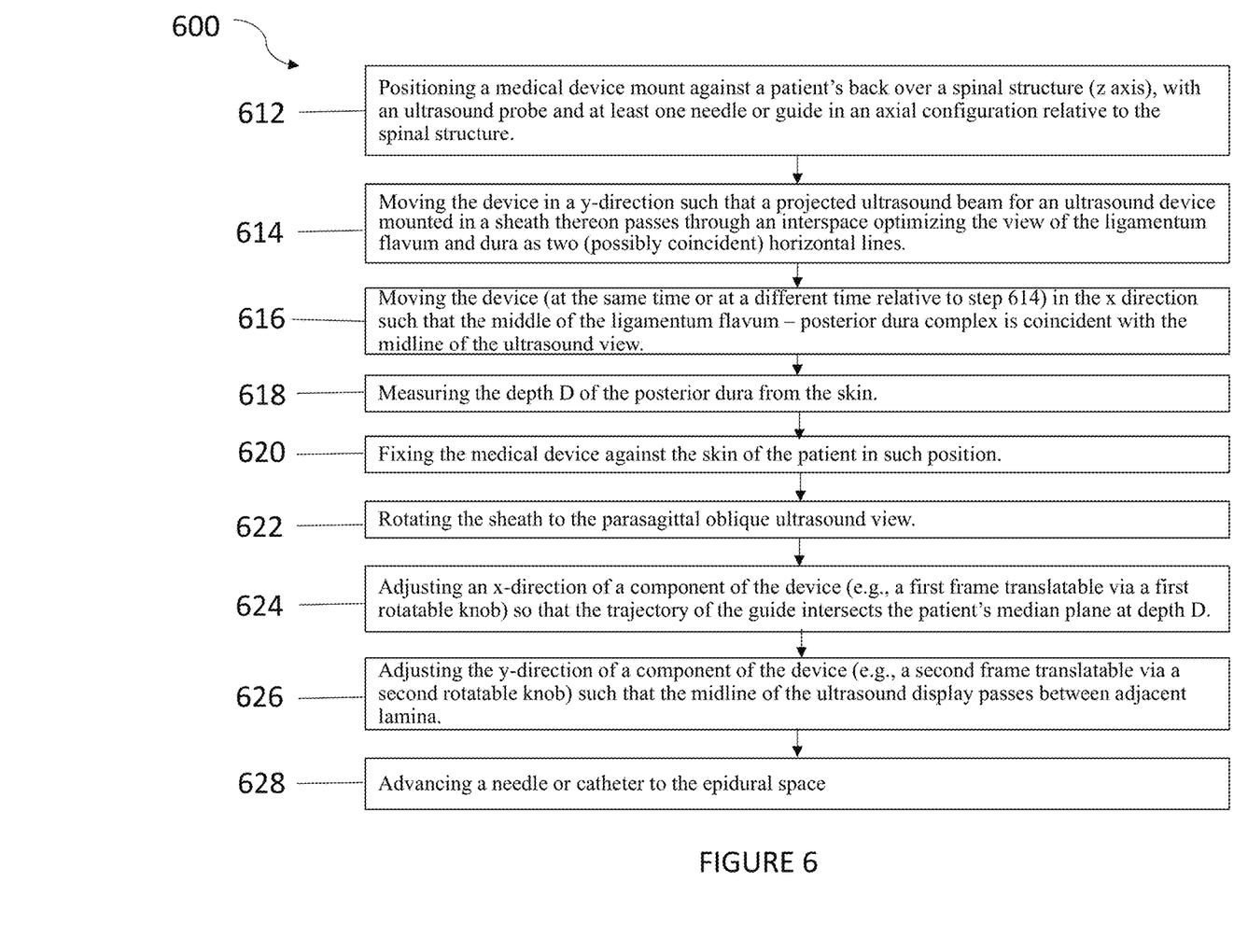
FIG. 6 is an exemplary flowchart of a method utilizing exemplary devices described herein

Referring now to FIG. 6, a method is shown generally at 600, with a first step 612 illustrating using, e.g., exemplary devices described above, to expose the patient's back and to identify the desired spinal level using either palpation or ultrasound. A common target for labor epidurals is the interspace between the third and fourth lumbar vertebrae. In the same step, a sterile field is established on the patient's back.

Also at step 612, a non-sterile ultrasound probe is loaded into the device and an integral flexible sterile sheath is extended to cover the probe cord (if the probe is wireless the flexible sterile sheath is not necessary).

Also at step 612, an exemplary device in accordance with the above is placed against the patient's back at the desired spinal level with the probe in the axial configuration.

In an exemplary step at 614, the device is moved in the y-direction such that the beam passes through the desired interspace, optimizing the view of the ligamentum flavum and dura as two horizontal (possibly overlapping) lines.

Figure 3D:
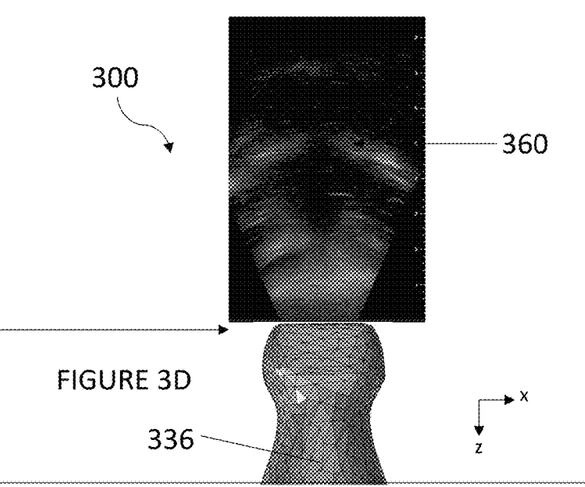
FIG. 3D is a top elevation view of an ultrasound display relative to the exemplary medical device of FIG. 3A.
Figure 4B:
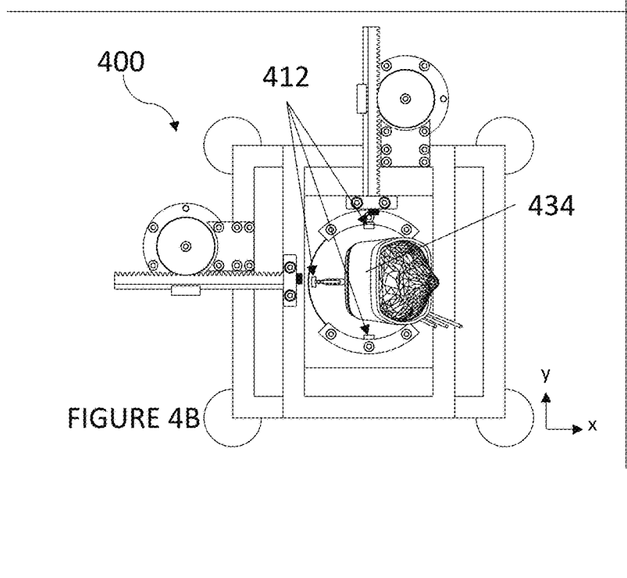
FIG. 4B is a front elevation view of the exemplary medical device of FIG. 4A.
Figure 4C:
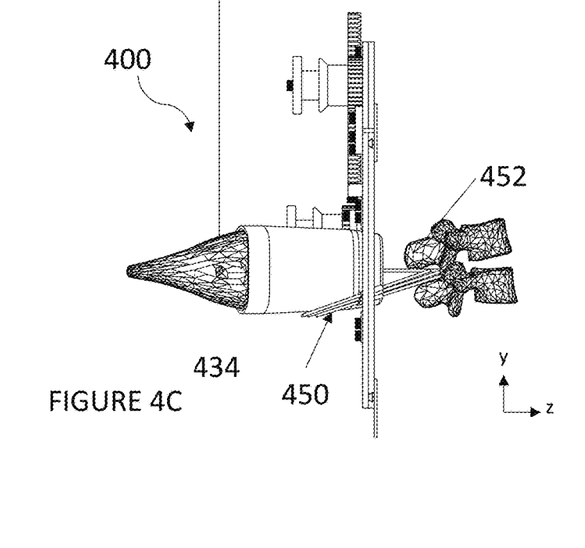
FIG. 4C is a side elevation view of the exemplary medical device of FIG. 4A.

In an exemplary step at 616, the device in moved the x-direction such that the middle of the ligamentum flavum— posterior dura complex is coincident with the midline of the ultrasound view (e.g., as in FIG. 3D, at 360).

In an exemplary step at 618, depth D of the posterior dura is measured from the skin. In exemplary embodiments, this can be done by estimating visually using the markings on the side of the ultrasound displays, by performing a freeze frame and using the ultrasound software calipers, or by using software specifically written in the ultrasound machine to detect the depth of the dura using machine learning, etc.

In an exemplary step at 620, one or more tabs at the edge of the device are used (e.g., pulled) to expose adhesive pads which cause the outer frame to adhere to the patient's skin and be held in place even if the operator lets go.

Figure 4D:
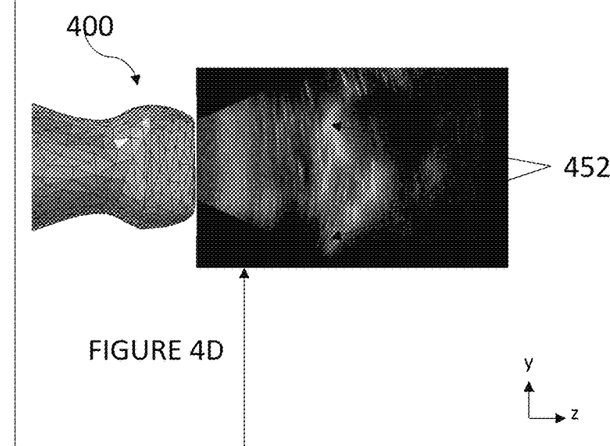
FIG. 4D is a top elevation view of an ultrasound display relative to the exemplary medical device of FIG. 4A.

In an exemplary step at 622, the probe sheath assembly is rotated 90 degrees counterclockwise and locked in place such that the ultrasound view is parasagittal oblique (e.g., as in FIG. 4D).

In an exemplary step at 624, the exemplary x knob on the device is rotated in order to translate the inner frame along the x-axis so that the trajectory of the desired needle guide intersects the patient's median plane at depth D. In exemplary embodiments, the device has markings adjacent to the x knob such that the operator has clear instructions for which needle guide to use and how to turn the knob for a given depth D (see FIG. 5).

In an exemplary step at 626, the exemplary y-knob is adjusted such that the midline of the ultrasound display passes between the adjacent lamina (e.g., as in FIG. 4D, with AI/machine learning, or otherwise e.g., with visualization). In exemplary embodiments, the ultrasound device has software which depicts virtual needle paths corresponding to one or more of the three needle guides. Furthermore, in exemplary embodiments, the ultrasound device has machine learning which allows it to identify the bony obstructions and suggest the proper y-knob manipulation to ensure the needle path is directed between the lamina.

In an exemplary step at 628, a needle is advanced through a selected needle guide using the loss of resistance technique to detect the epidural space. In exemplary embodiments, both hands may be used to hold the needle during this part of the procedure (as it typically done without ultrasound) because (as an advantage by virtue of the device itself) the entire device is held in place against the patient with adhesive pads or otherwise.

In an exemplary further step, the procedure is completed by advancing the catheter through the needle, removing the needle, and removing the device from the patient.

Transforaminal Epidural Steroid Injections, Paravertebrals, and Erector Spinae Plane Blocks The exemplary devices described herein may be used for more than epidurals and spinals. In particular, such devices may be used, e.g., for transforaminal epidural steroid injections, paravertebral injections/catheters, and erector spinae injections/catheters, among others. In each of these cases, the target space is lateral to the patient's midline.

To perform these procedures, step 616 is modified so that the target (e.g., spinal nerve foramen, paravertebral space, or erector spinae plane) is coincident with the ultrasound probe midline, and the depth of the target is noted. We note that for paravertebral and erector spinae blocks, it is favorable to have the probe angled laterally instead of medially because this aids in visualizing the pleural. By visualizing the pleural during the procedure, the operator can reduce the chance of puncturing it. To achieve the lateral angulation of the probe, the operator modifies step 526 by rotating the probe sheath assembly 90 degrees clockwise (for right-sided procedures). The needle guides for transforaminal epidural steroid injections, paravertebrals, and erector spinae plane blocks are now on the right side of the probe (338 in FIG. 3C).

These needle guides (Note that these correspond to FIG. 3C at the position labeled generally at 380 and at FIG. 4A at 480) originate at the center of the long edge of the probe and cross the midline of the probe beam at the same depths as the needle guides used for spinals and epidurals (i.e., 4 cm, 5 cm, and 6 cm). The needle guides for these off-midline procedures do not need a cephalad angulation since we do not need to traverse the angled window between the bony lamina. For left-sided procedures, the probe sheath assembly is rotated 90 degrees counterclockwise, and the procedure is performed as a mirror image of the right-sided procedure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A medical device placement, comprising:
   a medical device mount provided with a surface configured to position over and adhere to a human's back over a portion of the human's spinal structure, wherein the medical device mount includes a component that is translatable along the two dimensional surface of the human's back relative to the human spinal structure while the medical device mount is adhered to the portion of the human's back; and
   a sterile ultrasound probe sheath configured with an orientation at a predetermined angle relative to the human spinal structure, wherein the sheath is integral to or is configured to connect to the translatable component of the medical device;
   wherein the sheath includes at least one needle guide and is configured to at least partially rotate around an axis that is either perpendicular to the plane of the human back or offset by a specific angle from the perpendicular relative to the translatable component of the medical device mount to provide different ultrasound probe views and different approach vectors for the at least one needle guide dependent upon the rotational position of the sheath.

2. A device in accordance with claim 1, wherein the sheath includes three needle guides, each angled back to a path of an ultrasound probe beam directed by the sheath such that trajectories of each of the three needle guides intersect the beam at varying depths.

3. A device in accordance with claim 2, wherein the depths vary between 4 and 15 centimeters.

4. A device in accordance with claim 3, wherein the depths vary between 4 and 6 centimeters.

5. A device in accordance with claim 3, wherein the depths vary between 7 and 9 centimeters.

6. A device in accordance with claim 3, wherein the depths vary between 10 and 12 centimeters.

7. A device in accordance with claim 3, wherein the depths vary between 13 and 15 centimeters.

8. A device in accordance with claim 1, wherein the predetermined angle takes into account at least one patient parameter for that patient in order to achieve placement, including angle and depth of placement in target tissue.

9. A device in accordance with claim 8, wherein the at least one parameter is one or more of patient sex, age, height and weight.

10. A device in accordance with claim 1, wherein the predetermined angle is between 0 and 30 degrees.

11. A device in accordance with claim 10, wherein the predetermined angle is between 10 and 20 degrees.

12. A device in accordance with claim 1, wherein the translatable component comprises at least one inner frame that is translatable in an x-y axis direction relative to the spinal structure.

13. A device in accordance with claim 2, wherein the translatable component comprises at least one inner frame that is translatable in an x-y axis direction relative to the spinal structure and wherein the sheath with integral needle guides is rotatable around a z-axis.

14. A device in accordance with claim 13, wherein the z-axis rotatable portion includes guide markings for adjustment relative to a measured target depth D.

15. A device in accordance with claim 13, wherein translatable knobs adjust at least one inner frame in x-y axis directions.

16. A device in accordance with claim 13, wherein z-axis rotation of the sheath is facilitated by magnets or latches positioned at predetermined positions relative to a plurality of possible guide positions for the same device.

17. A method for lumbar epidural catheter placement, comprising:
   positioning and affixing a medical device mount against a human patient's back over a spinal structure (z axis), with an ultrasound probe and at least one needle guide in an axial configuration relative to the spinal structure, wherein the medical device mount includes a component that is translatable along the two dimensional surface of the human back relative to the human spinal structure and is configured to rotate the ultrasound and at least one needle guide relative thereto while the medical device mount is adhered to the portion of the human back;
   moving the translatable component in a y-direction such that a projected ultrasound beam for an ultrasound device mounted in a sheath thereon passes through an interspace optimizing the view of the ligamentum flavum and dura as two (possibly coincident) horizontal lines;
   moving the translatable component in the x direction such that the middle of the ligamentum flavum—posterior dura complex is coincident with the midline of the ultrasound view;
   measuring depth D of the posterior dura from the patient's skin;
   rotating the sheath to the parasagittal oblique ultrasound view;
   adjusting a component of the device in the x-y plane so that a trajectory of the guide intersects the patient's median plane at depth D and so that the midline of the ultrasound display passes between adjacent lamina; and
   advancing a needle and/or catheter to epidural space.

18. A method in accordance with claim 17, wherein said adjustment comprises adjusting a first component of the device in in an x-direction so that the trajectory of the guide intersects the patient's median plane at depth D and adjusting a second component of the device in the y-direction such that the midline of the ultrasound display passes between adjacent lamina.

19. A method in accordance with claim 17, wherein the medical device mount is provided with:
   a surface configured to position over a portion of a human spinal structure, wherein the medical device mount is translatable along the two dimensional surface of a human back relative to the human spinal structure via the translatable component; and
   a sterile ultrasound probe sheath configured with an orientation at a predetermined angle relative to the human spinal structure, wherein the sheath is integral to or is configured to connect to the medical device mount translatable component;
   wherein the sheath includes at least one needle guide and is configured to at least partially rotate around an axis on the medical device mount translatable component to provide different approach vectors for the at least one needle guide dependent upon the rotational position of the sheath.

20. A method in accordance with claim 19, wherein the sheath includes three needle guides, each angled back to a path of an ultrasound probe beam directed by the sheath such that guide trajectories of each intersect the beam at varying depths.

21. A method in accordance with claim 19, wherein the predetermined angle is 15 degrees.

22. A method in accordance with claim 19, wherein at least one inner frame is translatable in an x-y axis direction relative to the spinal structure and wherein the sheath and needle guides are rotatable around a z-axis.

23. A method in accordance with claim 17, where one or measurements are made utilizing software.

24. A method in accordance with claim 22, wherein the depth D of the posterior dura is measured via software.

25. A method in accordance with claim 23, wherein one or more measurements are made utilizing artificial intelligence.

26. A method in accordance with claim 25, wherein the depth D of the posterior dura is measured via artificial intelligence.

* * * * *